FIG. 1.

THE FRICTION COEFFICIENT OF THE SMOOTH, FLAT SURFACE AS A FUNCTION OF REYNOLDS NUMBER $R_N$

FIG. 9.

THE RELATIVE INCREASE IN CRITICAL REYNOLDS NUMBER AS A FUNCTION OF RESISTIVITY OF ATTENUANT LINING.

MAX O. KRAMER
INVENTOR.

BY William E. Martin
AGENT

MAX O. KRAMER
INVENTOR.

BY

AGENT

← DIRECTION OF FLOW

MAX O. KRAMER
INVENTOR.

BY William E. Martin

AGENT

FIG. 10

DIRECTION OF FLOW

Dec. 15, 1964   M. O. KRAMER   3,161,385
MEANS AND METHOD FOR STABILIZING LAMINAR BOUNDARY LAYER FLOW
Filed June 15, 1960   7 Sheets-Sheet 5

MAX O. KRAMER
INVENTOR.

BY William E. Martin

AGENT

United States Patent Office 3,161,385
Patented Dec. 15, 1964

3,161,385
MEANS AND METHOD FOR STABILIZING
LAMINAR BOUNDARY LAYER FLOW
Max O. Kramer, Pacific Palisades, Calif., assignor to
Coleman-Kramer, Inc., Los Angeles, Calif., a corporation of California
Filed June 15, 1960, Ser. No. 36,287
18 Claims. (Cl. 244—130)

This application is a continuation in part of my previous application entitled "Means and Method for Stabilizing Laminar Boundary Layer Flow," filed January 28, 1959, and identified by Serial No. 789,597 now abandoned, which application is in turn a continuation-in-part of my earlier application of the same title filed November 23, 1955 and identified by Serial No. 548,794, now abandoned.

My invention relates to means for reducing the frictional resistance between a solid body and a contiguous fluid under conditions of relative motion. More specifically, it is directed toward dynamically responsive surface means for maintaining laminar boundary layer flow so as to reduce the retarding force or drag normally caused by turbulence in the fluid adjacent the solid surface. By following the teachings of this invention, which in its various practices may be applied to both liquid and gaseous flow, it is possible to maintain a laminar boundary layer and the concomitant low drag coefficient under conditions where a turbulent boundary layer and the corresponding relatively high drag coefficient would otherwise prevail.

Studies of the behaviour of real fluids have shown that where relative motion takes place between a fluid and a solid boundary, as, for example, the hull of a ship, the wall of a pipe or duct, or the "wetted surface" of an aircraft in flight, the existence of viscous forces within the fluid results in the adherence of fluid particles to the solid boundary. Through the action of such forces, a velocity gradient is developed so that the state of relative motion between the solid boundary and the fluid is effectively zero at the boundary itself and equal to the free stream velocity at a small distance away from the boundary. The region in which this gradient exists is known as the "boundary layer," and its existence and character are responsible for a significant portion of the drag force experienced by the solid body due to its state of motion relative to the fluid. This type of drag, which is commonly known as "skin friction" or "viscous drag," may account for as much as 90% of the total drag experienced by well designed, fast-moving underwater vessels or aircraft.

It has been shown by L. Prandtl ("Uber Flussigkeitsbewegung bei sehr kleiner Reibung," Proceedings of the Third International Mathematical Congress, Heidelberg, 1904), H. Blasius ("Grenzschichten in Flussigkeiten mit kleiner Reibung, Zeitschrift fur Mathematik und Physik, Band 56, N. 1, 1908) and others that the flow characteristics of the boundary layer are directly related to the magnitude of the skin friction or viscous drag force exerted when a state of relative motion exists between a solid surface and a contiguous fluid. If the state of relative motion is described in terms of Reynolds number $$(R=UL/\nu$$

where: U is velocity, $\nu$ is kinematic viscosity of the fluid, and L is a representative dimension of the solid body), it may be demonstrated that above a certain critical value of this number the drag experienced by the solid surface, which may be expressed in dimensionless terms as the friction coefficient characteristic of the flow, undergoes a pronounced increase. This transition is due to a change in the character of the flow within the boundary layer.

Below the critical Reynolds number, the flow over a flat plate, for example, is characterized by an approximately linear increase in speed from the boundary surface to the free stream velocity; this condition is known as "laminar flow." Above the critical Reynolds number, however, this linear characteristic deteriorates and the fluid motion in the boundary layer rapidly becomes turbulent. Where the boundary between a relatively moving body and a contiguous fluid is defined by a smooth, solid surface, the transition from flow characterized by the low friction coefficient associated with sub-critical Reynolds numbers to that characterized by the relatively high friction coefficient associated with supercritical Reynolds numbers coincides exactly with this transition from laminar to turbulent flow in the boundary layer.

It has long been apparent to those skilled in the art that if means could be found to preserve and extend laminar boundary layer flow to the range of supercritical Reynolds numbers important in the operation of ships and aircraft, the consequent reduction of skin friction drag would not only alleviate a number of long-standing difficulties with respect to the design and propulsion of such craft, but would also result in substantial economic advantages through the reduction of power requirements and the increase of speed capabilities. Similarly, if such means could also be applied to the interior surfaces of pipes and ducts, it would be possible to enhance the economy and efficiency of transporting fluids over long distances. A further advantage to be gained through the preservation of laminar flow at supercritical Reynolds numbers, and one that is of importance to certain phases of naval warfare, is the suppression of noise generated by underwater vessels. For example, if cavitation is avoided, boundary layer turbulence is the sole remaining source of noise generated by the motion of such vessels. As the frequency spectrum of this turbulence extends over the acoustical range from approximately 10 to 10,000 cycles per second, it is apparent that the preservation of laminar flow would be of value in many phases of submarine warfare.

Various expedients have been developed in the prior art to favor laminar flow at Reynolds numbers above the usual critical value. It has been proposed, for example, to draw off a portion of the boundary layer along an airplane wing by suction at numerous points, leaving a thinner and more stable laminar boundary layer under high speed conditions. One disadvantage of this solution is that the suction pores must be extremely fine for the sake of surface smoothness, and such fine pores clog too easily. Dust or rain, for example, may upset the equilibrium completely and render the special surface valueless. The same sensitivity also exists with regard to ambient turbulence and local surface injuries or manufacturing imperfections. A further disadvantage is that continuous power is required to apply the suction.

Another expedient has been the design of so-called "laminar profiles" having pressure distributions that tend to favor the preservation of laminar flow. This solution, however, is only limited effectiveness and is applicable only in areas having negative pressure gradients and in a limited portion of the total range of Reynolds numbers. A further serious drawback is that the desired laminar flow may be upset by a minor surface irregularity or by ambient turbulence. This characteristic, in fact, is so marked that it has come to be known as "fly-speck sensitivity."

The present invention is based on the discovery that the flow characteristics in a relatively moving fluid adjacent to a solid surface may be controlled by making the surface resiliently pressure responsive and by providing viscous means cooperative therewith to dampen pressure fluctuations in the boundary layer. Such a resiliently pressure responsive, viscously damped surface serves the purpose of the invention by absorbing and dissipating the turbulent components of the boundary layer energy.

The action of such a surface and the mechanism whereby it achieves its effectiveness may be understood through consideration of the prevailing character of the boundary layer in both its laminar and turbulent flow conditions. As Reynolds number increases from the region where laminar flow normally prevails to the region where the transition to turbulent flow commences, the dynamic equilibrium of the boundary layer becomes progressively sensitive to periodic disturbances of specific frequency characteristics. As higher Reynolds numbers are attained, either at lengthwise positions increasingly distant from the bow or leading edge of the solid body or through an increase in the speed of relative motion, a critical point is reached where even the smallest disturbance will suffice to excite unstable oscillations in the boundary layer, and these oscillations, in turn, will rapidly degenerate into the violently agitated motion of turbulent flow. (Mathematical analyses of these phenomena are presented in the following references: 1. W. Tollmien, "Uber die Entstehung der Turbulenz," Gottinger Nachrichten, Mathematische-Physikalishe Klasse, 1929; 2. H. Schlichting, "Amplitude Distribution and Energy Balance of Small Disturbances in Plate Flow," NACA Technical Memorandum No. 1265; 3. H. Schlichting, "Boundary Layer Theory," McGraw-Hill Book Company, New York, 1955, Chapter XVI. An account of the experimental verification of these analyses is presented by G. B. Schubauer and H. K. Skramstad in "Laminar Boundary Layer Oscillations and the Stability of Laminar Flow," Journal of the Aeronautical Sciences, Volume 14, Number 2, February 1947). The resiliently yielding surface structure provided by the present invention, which is tuned to the frequency band characterizing the boundary layer pressure oscillations encountered in the region of the critical and supercritical Reynolds numbers, affords a means to oppose these oscillations and a medium in which to dissipate a significant portion of their energy. By damping the initial oscillations that give rise to turbulent boundary layer flow, the structure effectively raises the critical Reynolds number and correspondingly delays the onset of turbulence.

A variety of oscillation damping means may be used either singly or in combination to achieve the objects of the invention. In some practices of the invention, for example, advantage may be taken of the internal damping or mechanical hysteresis inherent in certain formulations of rubber or synthetic elastomers. A layer of such material having suitable stiffness, mass, hysteresis and thickness, will, if attached to the surface of a solid body, respond to external pressure fluctuations in the manner of a uniformly distributed, viscously damped compression spring. The deflection of such a spring in response to local variations of boundary layer pressure will effectively dissipate a portion of the oscillatory energy that would otherwise expend itself in the generation of turbulence. In other practices of the invention a membrane or diaphragm of resilient material may be used to transmit boundary layer pressure fluctuations to a separate viscous damping medium. This medium, which may take the form of a fluid of suitable viscosity confined between the membrane and the rigid surface of the solid body, may also be arranged to provide numerous internal paths for pressure communication between spaced points of the surface membrane. Such paths further contribute to the effectiveness of the structure through their tendency to oppose the development of local pressure gradients in the boundary layer and hence to maintain the dynamic equilibrium characteristic of laminar flow. In this regard, further features of the invention, which will be made apparent in subsequent portions of this specification and in the appended drawings, lead to the provision of resilient, fluid-confining surface structures of this character that may be economically fabricated and may be designed for operation over particular ranges of Reynolds number and velocity.

The invention may be further understood by reference to the accompanying drawings. In the drawings, which are to be regarded as merely illustrative.

Figure 1:
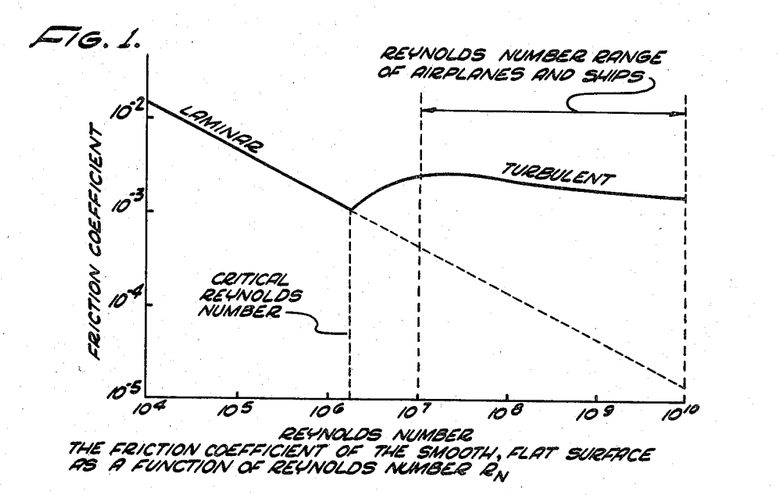
FIGURE 1 is a well-known graph of the friction coefficient of a smooth, solid surface plotted against Reynolds number.

As is well known to those skilled in the art, the friction between a smooth, flat, rigid surface (flat plate) and a contiguous real fluid (i.e., a fluid having both density and viscosity) may be expressed as a continuous function of Reynolds number, which varies directly as the length of the surface and the velocity of flow and inversely as the kinematic viscosity of the fluid; a graphical representation of this function for the range of Reynolds numbers generally encountered in practical aero- and hydro-dynamics is presented in FIGURE 1. Below approximately $R=10^6$, the friction coefficient follows the law for laminar flow and declines as the Reynolds number increases. Above approximately $R=10^6$, however, the boundary layer becomes progressively turbulent and the friction coefficient first rises sharply then, at still higher Reynolds numbers, reaches a maximum and declines at a slower rate than that which prevails in the region of laminar flow. Thus, for instance at $R=10^8$, the actual friction coefficient is fifteen times greater than it would be if the boundary layer remained laminar up to this Reynolds number.

As has been previously pointed out, the transition from laminar to turbulent flow that gives rise to the sudden change in friction coefficient indicated in FIGURE 1 is caused by a gradual change in the dynamic stability of the boundary layer. Below the critical Reynolds number, the viscous forces within the fluid predominate over the inertia forces and tend to maintain the laminar flow condition. Under this condition, the viscous damping inherent in the fluid itself is sufficient to preserve the stability of the flow. The ratio of the viscous to the inertia forces is inversely proportional to the Reynolds number, however, and as the critical Reynolds number is attained the inertia forces become progressively dominant until a condition of neutral equilibrium is reached. At this point, any small disturbance or variation in local velocity, such as might be caused by irregularities in the surface forming the flow boundary or by ambient turbulence in the fluid, will disturb the critical balance between the inertia and viscous forces. H. Schlichting, in the references previously cited has shown that this results in a dynamic instability leading to a condition of self-sustaining oscillation. (This state may be compared, for example, to that prevailing electrically in a typical oscillator circuit. Isolated from all disturbances, such a circuit may continue in a state of neutral equilibrium; any disturbance, however, such as thermal noise or a switching transient, suffices to establish oscillation at the frequency to which the circuit is tuned.)

Theoretical considerations indicate that it would be possible to influence the dynamic stability of the boundary layer and thereby to delay the onset of turbulence by increasing the viscosity, and hence the inherent viscous damping, of the ambient fluid; it is clear, however, that such a measure does not lend itself to practical realization. Attempts to circumvent this difficulty and control the character of the boundary layer by other expedients, for example, the application of suction at appropriate surface points or the design of special shapes, as previously discussed, have met with only limited success. The present invention, therefore, which is based on the discovery that additional viscous damping may be introduced to the boundary layer by means external to the fluid itself, represents both a radical departure and a significant advance over the teachings of the prior art.

Theoretical analysis by Schlichting, and experimental work reported in the reference of G. B. Schubauer and H. Skramstad previously cited, have demonstrated that the oscillatory condition of the boundary layer at critical and supercritical Reynolds numbers is characterized by a natural frequency that may be accurately predicted as a function of Reynolds number, velocity and kinematic viscosity. The calculations necessary to this prediction are described in Chapter XVI of the book "Boundary Layer Theory" by H. Schlichting, McGraw-Hill Book Company, New York 1959, previously cited and hereby incorporated in this disclosure. For the purpose of understanding the present invention, these calculations may be simplified by use of the graph presented in FIGURE 19, which is derived from FIGURES 16.6 and 16.7 of the cited reference.

Figure 19:
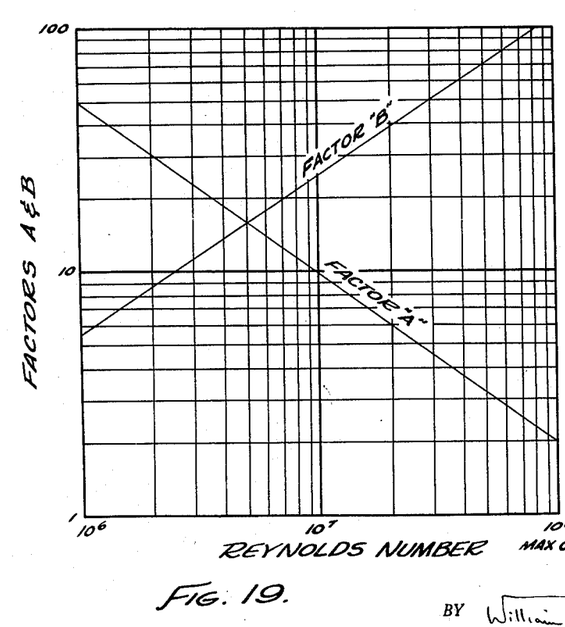
FIGURE 19 is a graph illustrating a relation between flow velocity, Reynolds number, and factors proportional to the critical wave length and frequency of boundary layer disturbances.

In FIGURE 19, the factors A and B are dimensionless coefficients relating the velocity and kinematic viscosity of the fluid to the critical frequency and wave length of the boundary layer according to the following equations:

$$f_c = A \cdot 10^{-7}\left(\frac{U_o^2}{\nu}\right) \qquad \text{Eq. (1)}$$

$$\lambda_c = B \cdot 10^4\left(\frac{\nu}{U_o}\right) \qquad \text{Eq. (2)}$$

in which $f_c$ and $\lambda_c$ are, respectively, the frequency and wave length of the critical oscilation; $U_o$ is the free stream flow velocity; and $\nu$ is kinematic viscosity in units consistent with the dimensions of $U_o$. In addition, the functional relation between factors A and B is such that the following approximate equation may also be derived:

$$f_c \times \lambda_c = 0.26 U_o \qquad \text{Eq. (3)}$$

Thus, for example, on a solid body moving through fresh water at 20 feet per second, the Reynolds number at a point 10 feet from the bow would be:

$$R = \frac{U_o L}{\nu} = \frac{20 \times 10}{1.08 \times 10^{-5}} = 1.85 \times 10^7$$

Figure 14:
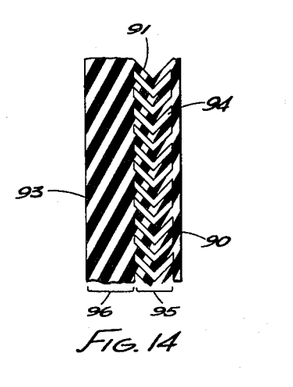
FIGURE 14 is a cross-sectional view on an enlarged scale taken along the line 14—14 of FIGURE 13.

Referring to FIGURE 14, Factor A at this Reynolds number is found to be 6.6, and the critical boundary layer frequency is:

$$f_c = A \cdot 10^{-7}\left(\frac{U_o^2}{\nu}\right) = \frac{6.6 \times 10^{-7}(20)^2}{1.08 \times 10^{-5}}$$

$$= 24.4 \text{ cycles per second;}$$

and the wave length of this disturbance is:

$$\lambda_c = \frac{.26 U_o}{f_c} = \frac{.26(20)}{24.4}$$

$$= 0.2 \text{ ft.}$$

In the following discussion of the various practices of the invention, the importance of these equations to the design of a specific embodiment will be made apparent to those skilled in the art.

As the primary disturbance characterizing the transition to turbulent boundary layer flow can be shown to be an oscillatory phenomenon of predictable frequency, it is theoretically possible to devise means whereby the disturbance energy may be dissipated in a medium other than the fluid itself. In the mechanical and electrical arts, for example, it has long been known that the energy of certain critical disturbances may be effectively dissapated by means of a resonant system tuned to the characteristic frequency thereof and arranged so as to operate in counterphase thereto. Under ideal conditions, such a resonant system, coupled to the pressure oscillations characterizing the onset of boundary layer instability, would dissipate the disturbance energy at its point of origin and prevent the downstream propagation of turbulence. Since the critical frequency characterizing the onset of boundary layer instability has been shown to be a function of both Reynolds number and velocity, however, the efficiency of any structure using counterphase resonance as a means for boundary layer control would appear to be limited to a very narrow range of operating conditions. In the present invention, this limitation is circumvented through the provision of a resonant surface structure in which viscous damping is used to extend the response frequency over a band substantially coinciding with the entire spectrum of anticipated boundary layer oscillations.

In general, the resonant surface structure of the present invention includes a pressure responsive membrane or diaphragm in contact with the fluid boundary layer and supporting means therefor which cooperatively meet certain requirements. One of these requirements is that the membrane be sufficiently resilient to yield to small, local variations in the boundary layer pressure and to transmit these variations to a viscous damping medium effectively isolated from flow communication with the boundary layer. This medium may, for example, take the form of a viscous fluid or of a deformable solid or semi-solid material, such as certain formulations of rubber or synthetic elastomers, capable of dissipating energy through mechanical hysteresis. In some practices of the invention a further requirement is that the membrane be supported in spaced relation from the rigid surface of the solid body to which it is attached so as to provide a number of internal paths for pressure communication, these paths being preferably so arranged as to connect points of the resilient membrane separated from each other in the direction of boundary layer flow by approximately one half the wave length of the critical boundary layer pressure oscillations. Where the structure is required to achieve its maximum effectiveness over a specific range of Reynolds numbers, it may be tuned to provide the most favorable damping characteristics for the range of critical boundary layer oscillation frequencies to be encountered at these Reynolds numbers. This tuning may be accomplished by appropriate choice of the dimensions and physical properties of the membrane and damping medium, as will be discussed hereinafter. The details and operation of the structure and the important considerations relative to the design of a specific embodiment will be explained by reference to the accompanying drawings.

Figure 2:
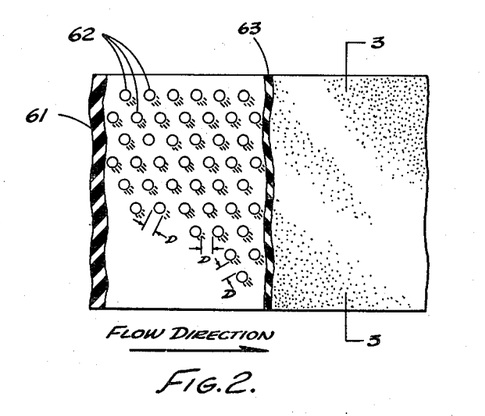
FIGURE 2 is a fragmentary plan view of a multiple layer surface structure embodying the principles of the invention with successive layers broken away.
Figure 3:
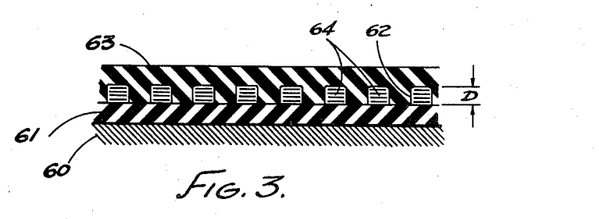
FIGURE 3 is a cross-sectional view on an enlarged scale taken along the line 3—3 of FIGURE 2.

In the embodiment of the invention shown in cross sectional view in FIGURE 3 and in fragmentary plan view in FIGURE 2, the rigid surface of the immersed body 60 is coated with a uniform layer of rubber or elastomeric material 61 which is firmly bonded in place. A second layer of resilient material 63 comprises a pressure responsive outer membrane or diaphragm which is supported in spaced relation to the first layer by a plurality of regularly distributed stubs or buttons 62, also of resilient material. The stubs 62 may be integrally molded with either of the layers 61 or 63; in practice, however, it has generally been found more advantageous to mold them integrally with the second layer, or diaphragm, 63. Between the base plate layer 61 and the outer membrane or diaphragm 63, the space surrounding the stubs 62 is filled with a damping fluid 64 of suitable viscosity. In practice, Silicone Fluid 200, manufactured by the Dow Corning Corporation of Midland, Michigan, has been successfully used for this purpose. The physical characteristics of this fluid, which may be obtained in viscosities ranging from 0.6 to 200,000 centistokes, are highly stable over a wide range of temperatures and it is non-injurious to rubber and most elastomeric compounds. In the recommended practice of the invention, a multiple layer surface structure of this type is applied to all portions of an immersed body where it is desired to maintain laminar flow at greater than critical Reynolds numbers. As indicated in the preceding discussion of the nature of boundary layer turbulence, the physical characteristics, such as mass, stiffness and damping, of a surface structure according to the invention must be correlated with the predicted boundary layer conditions. This correlation may be achieved by computing the critical boundary layer frequency to be attenuated and considering the characteristics of an element of the surface structure having a length equal to one-half the corresponding wave length.

Figure 18:
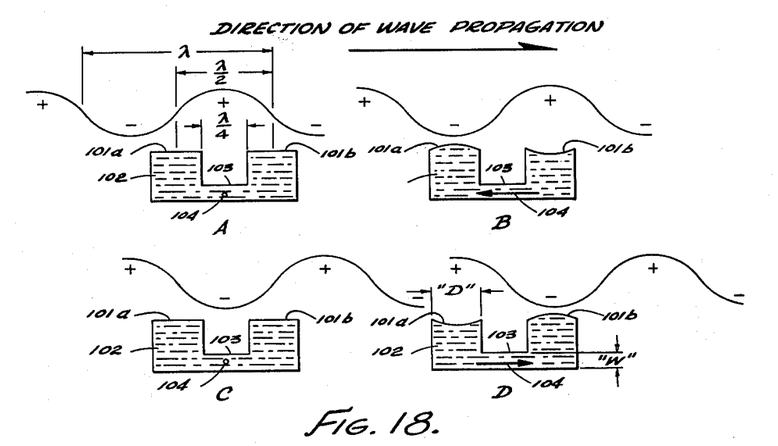
FIGURE 18 schematically illustrates the behavior of a single element of a surface structure according to the present invention in response to the passage of a single pressure wave.

To illustrate the following discussion of these considerations, the behavior of a single element of the surface structure in response to the passage of a single boundary layer pressure wave at successive instants of time, respectively designated A, B, C and D, is shown schematically in FIGURE 18. In this figure, the numerals 101a and 101b designate elements of the surface membrane or diaphragm which are separated from each other by one-half the length of the boundary layer pressure wave, $\lambda$; the numeral 102 designates the viscous fluid confined in the damping element; the numeral 103 designates the internal passage or capillary connecting the two elements of the diaphragm; the numeral 104 designates the velocity vector of the confined viscous fluid in response to the action of the boundary layer pressure wave at the successive instants A, B, C and D; the dimension "D" denotes the representative diameter of the effective diaphragm area; the dimensions "W" and $\lambda/4$, respectively, denote the effective width and length of the internal passage or capillary in which the damping fluid moves; and the plus and minus signs associated with the wave in its successive representations denote local pressures respectively greater and less than that due to the over-all pressure gradient.

In order to design a uniform structure adaptable to use throughout the entire length of a fluid-immersed solid body, the calculation of critical boundary layer frequency and wave length and of the corresponding mass, stiffness and internal damping of the surface structure may be based on the flow conditions prevailing at a point one-third of the way from the bow to the stern at a desired velocity. Thus, referring once more to FIGURES 2 and 3, if the stubs 62 have equal diameter, spacing and length, as indicated by the dimension D, the effective mass of the fluid in a single damping element may be expressed in the approximate form:

$$M = \lambda/4 \times D^2 \times \rho_d \qquad \text{Eq. (4)}$$

where $\lambda$ is the wave length of the critical boundary layer wave as computed from FIGURE 14; $\lambda/4$ is the effective length of the fluid column in a single damping element; and $\rho_d$ is the density of the damping fluid. If the thickness of the diaphragm 63 is small in comparison with the wave length, its mass may be neglected. The undamped natural frequency of the structure, $\omega_0$, may then be determined from the relation:

$$\omega_0 = \sqrt{\frac{S'}{M}} \qquad \text{Eq. (5)}$$

where $S'$ is the effective stiffness acting on the lumped mass of a single damping element. This may be related to the actual diaphragm stiffness $S$ by the ratio of damping fluid displacement to diaphragm displacement. Thus, if $\lambda/4$, $W$, and $A_1$ are the effective length, width, and amplitude of movement, respectively, of a unit mass of the damping fluid, the volume represented by their product, $\lambda W A_1/4$, must equal the corresponding volume displaced by a diaphragm of area $D^2$ as it moves through an amplitude $A_2$. Equating the two volumes, the ratio of $A_1$ to $A_2$ may be derived:

$$\frac{A_1}{A_2} = \frac{4D^2}{\lambda W}$$

The pressure per unit deflection of the diaphragm, in terms of the actual stiffness, is then $4D^2 S/\lambda W$, and the total force due to this pressure is $4D^4 S/\lambda W$. Since there is a diaphragm at each end of the fluid mass moving in a single damping element, the effective stiffness is equal to twice this value; that is $$S' = \frac{8D^4 S}{\lambda W} \qquad \text{Eq. (6)}$$

Substituting this value, and the computed value of the lumped mass of a single damping element, in the equation for the undamped natural frequency of the damper, the required diaphragm stiffness $S$ for narrow bandwidth tuning may be derived:

$$\omega_0 = \sqrt{\frac{32 D^2 S}{\lambda^2 W \rho_d}}$$

or, in terms of cyclic frequency rather than circular frequency, this may be expressed in the alternate form:

$$f = \frac{1}{2\pi}\sqrt{\frac{32 D^2 S}{\lambda^2 W \rho_d}} \qquad \text{Eq. (7)}$$

Equating this frequency to the critical boundary layer frequency given by FIGURE 19, and using the approximate relation $f_c \times \lambda_c = 0.26 U_0$, the required diaphragm stiffness may be related to the flow velocity:

$$f_c = \frac{1}{2\pi}\sqrt{\frac{32 D^2 S}{\lambda^2 W \rho_d}}$$

$$S = \frac{\pi^2 f_c^2 \lambda_c^2 W \rho_d}{8 D^2}$$

$$S = \frac{\pi^2 (0.26 U_0)^2 W \rho_d}{8 D^2}$$

$$S = \frac{0.0835 \cdot U_0^2 \cdot W \cdot \rho_d}{D^2} \qquad \text{Eq. (8)}$$

Thus, it is apparent that the required stiffness may be computed on the basis of flow velocity and the dimensions of the damping elements alone; that is, that it may be treated independently of Reynolds number and critical frequency, which, as has been previously shown, are subject to progressive change from bow to stern or from leading edge to trailing edge of the body under consideration. It has been additionally determined by experimental means that, for optimum broadband response, the value of skin stiffness S should be approximately five times the value computed for narrow bandwidth.

The appropriate viscosity of the damping fluid for broadband response may be derived from consideration of the maximum energy absorbed by a single damping element. For simplicity, it may be assumed that the damping is solely a function of the fluid motion in the passages or channels between the base layer 61 and the outer diaphragm 63, and that the damping contributed by the hysteresis of the resilient material comprising the base layer, the diaphragm and the intermediate stubs is negligible. The differential equation describing the fluid motion in a single damping element may be written in the form:

$$M\ddot{a} + b\dot{a} + S'a = F \sin(\omega t) \quad \text{Eq. (9)}$$

where M is the fluid mass as expressed in Eq. 4; $a$ is the instantaneous amplitude of the mass; $\dot{a}$ and $\ddot{a}$, respectively, are the first and second derivatives of the amplitude with respect to time; $b$ is the viscous force coefficient due to unit oscillatory speed of the damping fluid; $S'$ is the effective diaphragm stiffness at unit amplitude, as expressed in Eq. 6; and $F \sin(\omega t)$ is the driving force due to the boundary layer oscillation. Then, if $$\omega_0 = \sqrt{\frac{S'}{M}}$$

represents the circular response frequency of the element at zero damping, the maximum amplitude of the fluid mass M may be expressed by the following equation:

$$a_{max.} = \frac{F}{\sqrt{(\omega_0^2 - \omega^2)^2 + \left(\frac{b\omega}{M}\right)^2}} \quad \text{Eq. (10)}$$

Since, for large bandwidth, $\omega_0^2$ is much greater than $\omega^2$, this expression may be simplified to the form:

$$a_{max.} = \frac{F}{\sqrt{S'^2 + (b\omega)^2}} \quad \text{Eq. (10a)}$$

As the energy absorbed by the damping element is proportional to the product $b \cdot a^2_{max.}$, the value of the damping constant $b$, which will lead to a maximum value of this function may be determined by differentiation. Thus, if $$\phi(b) = \frac{1}{b \cdot a^2_{max.}}$$

and $a_{max.}$ is expressed according to Equation 10a, the first derivative, $\phi'(b)$, may be equated to zero to yield the result:

$$b_{opt.} = \frac{S'}{\omega} \quad \text{Eq. (11)}$$

From this expression, a close approximation to the damping fluid viscosity required for a broadband damping structure of given dimensions may be derived by means of the well-known Hagen-Poiseuille law describing fluid motion in capillaries (see, for example, "Fluid Mechanics" by R. A. Dodge and M. J. Thompson, McGraw-Hill Book Company, Inc., New York, 1937; pages 171–174 and 201–202). Because these calculations do not take into consideration the internal damping contributed by the mechanical hysteresis of the resilient material comprising the outer diaphragm 63, the base layer 61, and the intermediate stubs 62, the actual viscosity required will be slightly less than the computed value. In practical embodiments of the invention, however, this discrepancy is of small magnitude and may be readily compensated by empirical adjustment of the fluid viscosity.

Figure 4:
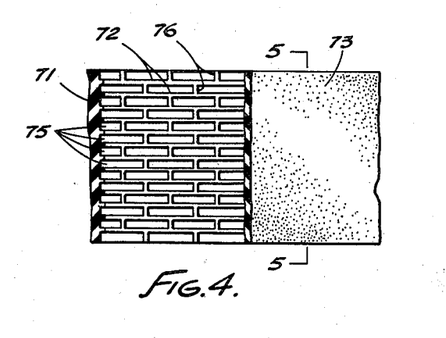
FIGURE 4 is a fragmentary plan view of an alternate embodiment of the invention with successive layers broken away.
Figure 5:
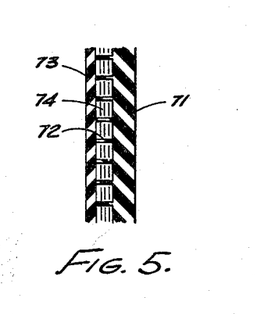
FIGURE 5 is a cross-sectional view taken along the line 5—5 of FIGURE 4.

FIGURE 4 is a fragmentary plan view of a second embodiment of the invention in which the stubs separating the base layer 71 and the outer membrane 73 are replaced by longitudinal partitions 72 extending in flow direction so as to define a plurality of fluid filled grooves or channels 75. Transverse partitions 76 may be inserted at intervals of not less than one-half wave length between the longitudinal partitions in order to prevent lengthwise flow of the damping fluid in response to the over-all external pressure gradient. The substitution of the longitudinal partitions for the previously described stubs makes this second embodiment of the invention anisotropic in that the responsiveness of the construction to traveling fluid waves varies with the orientation of the structure relative to the direction of flow of the waves. Thus, if the structure were turned 90° with the direction of flow perpendicular to the channels 75 defined by the partitions 72, the partitions 72 would be spaced apart less than less than one-half of the length of the waves. The operation of this embodiment of the invention is similar to that of the embodiment shown in FIGURES 2 and 3. Cyclic pressure variations due to incipient boundary layer oscillations or to ambient turbulence in the fluid medium are impressed on the outer resilient diaphragm 73 and transmitted to the damping fluid 74 confined in the channels or grooves 75. The damping fluid acts both as a pressure transmitting medium, providing paths of pressure communication connecting spaced surface points between which local pressure gradients due to incipient turbulence may exist, and as a viscous damping medium. A pressure differential transmitted to the damping fluid by the diaphragm gives rise to a movement of the fluid as shown schematically in FIGURE 18. As the fluid moves from a region of relatively high pressure to one of relatively low pressure, the internal opposition to motion due to the fluid viscosity dissipates the energy of the boundary layer oscillations. As pointed out in the preceding discussion, this action is analogous to that of a dashpot in a mechanical system, and, by means of appropriate selection of cooperative spring rates and masses, the combination may be tuned for a desired response within a given frequency band. The mathematical approach to the analysis and design of a structure according to the embodiment of the invention shown in FIGURES 2 and 3 may also be applied to the structure illustrated in FIGURE 4.

Figure 13:
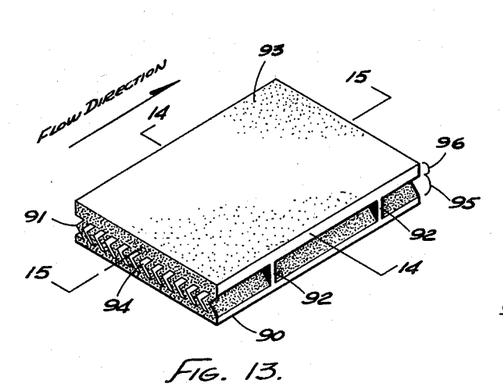
FIGURE 13 is a perspective view of a composite material embodying the principles of the invention and adapted to simplified manufacturing processes.
Figure 15:
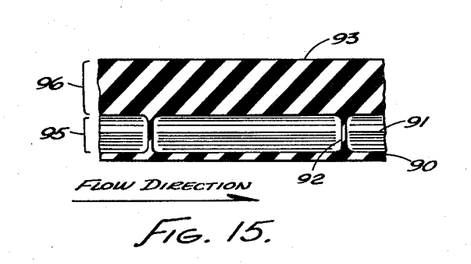
FIGURE 15 is another cross-sectional view on an enlarged scale taken along the line 15—15 of FIGURE 13.

In practical embodiments of the invention, it has been found that the most favorable drag reduction is achieved when a comparatively soft rubber or elastomer is used for the outer diaphragm and the intermediate stubs or ridges. Specifically, it has been found that the optimum drag reduction is attained when the compressive elastic modulus of the multiple layer structure, as measured normal to its surface, lies within the range extending from approximately 25 to approximately 100 pounds per square inch. One disadvantage that accompanies the use of such soft material, however, lies in the fact that the structure tends to be extremely vulnerable to accidental injury or damage. Tearing, puncture or abrasion incurred by collision with fixed objects or with solid material entrained in the ambient fluid can impair or totally destroy the effectiveness of the structure. An embodiment of the invention that circumvents this difficulty through the use of high strength material to achieve a low compressive modulus of elasticity normal to the surface is shown in FIGURES 13, 14 and 15. A further advantage of this embodiment, as will be made apparent in the following description, is that it lends itself to manufacture by relatively inexpensive methods.

In FIGURE 13, which is a perspective view of a portion of a multiple layer surface structure which provides distributed boundary layer damping, the numeral 90 denotes a base layer of rubber or elastomeric material for attachment to the surface of a solid body. As this layer does not contribute to the damping function of the structure, it need only be thick enough to provide the requisite mechanical strength for secure attachment and for adequate support of the two layers generally denoted by numerals 95 and 96. The layer 95 comprises a plurality of uniformly spaced longitudinal partitions 91, between each pair of which extends a corresponding, similarly-shaped, fluid-filled space 94. The relative arrangement of partitions and spaces is more clearly illustrated in FIGURE 14, which is a transverse section on an enlarged scale taken along the line 14—14 of FIGURE 13. Each of the partitions 91 consists of an elongated strip of material, preferably formed integrally with the base layer 90 and the outer diaphragm layer 96, and folded about a longitudinal axis so as to include an angle of approximately ninety degrees, as shown. The purpose of this inflection or bent cross-sectional configuration is to support the outer diaphragm 96 away from the base layer 90 by means of the bending or flexural strength, rather than the compressive strength, of the relatively thin sections of rubber comprising the partitions. Thus, the effective modulus of elasticity of the multiple layer structure in a direction normal to the diaphragm surface 93 is substantially lower than if the diaphragm were supported by stubs or ridges stressed solely in compression. The same effect can, of course, be achieved through the use of partitions having different shapes from those shown in FIGURES 13 and 14. For example, partitions of curved or arcuate cross-section may be used, or a plurality of small substantially cylindrical tubes may be aligned in flow direction and uniformly spaced from each other so as to allow for flexure of their respective walls.

FIGURE 15, which is a sectional view on an enlarged scale taken along the line 15—15 of FIGURE 13, shows the arrangement of transverse partitions, denoted by the numeral 92, which inhibit the movement of the damping fluid in response to over-all pressure gradients existing in the direction of flow. These partitions, which may be molded integrally with the remainder of the structure, should be spaced at intervals of not less than one-half the wave length of the characteristic boundary layer oscillations. As this dimension increases from bow to stern, it is desirable to provide a correspondingly increased spacing of the partitions 92. If the structure is produced by an extrusion process, for example, such an increase in partition spacing may be achieved through control of movable members in the extrusion die. These members may also incorporate provision for injecting the damping fluid into the cavities during manufacture so that the resulting structure need only be fitted and attached to the vessel or surface on which it is to be used. Where the length over which it is desired to apply the multiple layer structure to control boundary layer turbulence is great enough to require that the viscosity of the damping fluid be varied from bow to stern, this variation too may be accommodated through suitable control of the fluid injection mechanism during manufacture.

The outer diaphragm layer, denoted by the numeral 96 in FIGURES 13, 14 and 15, is provided with a surface 93 for contact with the ambient fluid, the surface 93 preferably being as smooth as possible and free from small protuberances, indentations, scratches or blemishes such as might be caused by manufacturing imperfections. The thickness of the diaphragm layer 96, which must be correlated with the mechanical properties of the rubber or elastomeric material used and with the conditions under which it is to operate as hereinbefore set forth, should not exceed the average thickness of the boundary layer as defined by the equation $$T = \frac{3.4L}{\sqrt{R}}$$

in which T is thickness, L is the average length of the flow under consideration, and R is the average Reynolds number. Within this limit, however, it is advantageous to use a relatively thick diaphragm as illustrated in FIGURES 13, 14 and 15. The greater thickness not only provides greater mechanical strength so as to afford a measure of protection against accidental injury such as tearing or puncture, but also it provides a second damping medium which may be broadly tuned to the much higher frequency of boundary layer disturbances that may be excited by small surface imperfections or injuries. These disturbances, which are generally known as "virgin turbulence," may occur downstream from surface irregularities and are generally characterized by substantially higher frequencies and shorter wave lengths than oscillation due to incipient boundary layer instability. If it is not damped or dissipated by artificial means, such as those contemplated in the present invention, this type of turbulence propagates itself over an included angle of approximately 20 degrees downstream from its point of origin and may account for a significant increase in drag even at sub-critical Reynolds numbers. For greatest effectiveness, therefore, the thickness, stiffness and inherent damping of the outer diaphragm should be chosen so as to provide the best possible damping for the virgin turbulence. The calculation of the diaphragm parameters necessary to achieve this damping is analogous to the methods previously outlined with respect to the damping of the boundary layer oscillations occurring at the critical Reynolds number, and may be based on the assumption that pressure communication between different portions of the extremely short waves of virgin turbulence occurs only within the diaphragm; that is, that the damping fluid confined by the diaphragm does not participate in the response to pressure oscillations due to virgin turbulence.

It is apparent that this embodiment of the invention shown in FIGS. 13, 14, and 15 is also anisotropic. Thus, in FIG. 13, the arrow indicates that the flow direction is longitudinally of the closely spaced partitions 91, the other ribs 92 being transverse to the direction of flow and being spaced relatively far apart. If the structure were turned 90°, the closely spaced partitions 91 would be transverse to the direction of flow.

Figure 16:
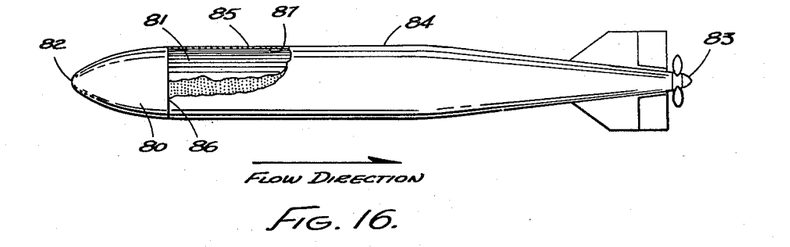
FIGURE 16 is a semi-diagrammatic view showing the method of applying the invention to the surface of a submersible vessel.

FIGURE 16 illustrates in semi-diagrammatic fashion the method of applying the invention to a rigid body 80 adjacent to which it is required to stabilize laminar boundary layer flow so as to preserve a minimum friction coefficient. The body shown is a solid of revolution resembling a submarine torpedo in shape and proportions, though it is to be understood that the invention may also be applied according to similar principles to the hull of a surface vessel, the blades of a screw propeller, the wings, fuselage or control surfaces of an aircraft, or the interior of a fluid-carrying pipe or duct. Referring to the drawing, numeral 81 denotes the rigid surface of an immersed body 80 having a bow 82 and a stern 83. The multiple layer flow stabilizing structure, generally denoted by the numeral 84, is applied over all of that surface of the body where it is anticipated that super-critical Reynolds numbers will be encountered and it is required that laminar boundary layer flow be maintained. In general, because Reynolds number is a function of the flow length measured from the bow, super-critical Reynolds numbers will not be encountered at the extreme forward end of the body and it will, therefore, be unnecessary to apply the stabilizing structure over this portion. It is to be understood, however, that in some cases, such as on the hydrofoils of screw propellers or on airfoils, where manufacturing or other considerations may render it expedient to do so, the entire wetted surface may, of course, be covered with the stabilizing structure. Where the stabilizing structure commences at some point aft of the bow, as shown in FIGURE 16, care must be taken to assure that the transition from the rigid surface to the resilient structure occurring at the joint 86 be absolutely smooth. A gap or ridge at the joint will disturb the normal flow stability to the extent of lowering the critical Reynolds number and thereby influencing the critical boundary layer frequency and wave length so as to jeopardize the performance of the stabilizing structure. It is also important that the stabilizing structure be firmly attached so that no relative motion is possible between the base layer 87 and the rigid surface 81. For the embodiments of the invention shown in FIGURES 2, 3, 4, 5, 13, 14 and 15, the attachment may be made by means of any of a number of cements and bonding compounds that are readily available on the market. For some applications, the tensile characteristics of the stabilizing structure and the coefficient of friction existing between the base layer 87 and the rigid surface 81 are sufficient to allow a wholly satisfactory shrink fit without the use of any adhesives. For the embodiments of the invention shown in FIGURES 6, 7, 8, 10, 11 and 12, the base portion of the structure may be attached to the surface of the body by any of the well-known means for fastening rigid members, and the pressure responsive outer diaphragm may be bonded in place with a suitable adhesive. In all embodiments, care must be taken to assure that the outer diaphragm is sufficiently resilient to respond to local pressure variations but is not so flexible as to assume a bumpy or corrugated surface reflecting the pattern of supporting stubs or ribs. The fluid filling may be introduced either by means of a tube inserted through the outer diaphragm or by means of an appropriate orifice in the base plate. In embodiments of the invention that have been tested on small bodies, a hypodermic needle inserted through the outer diaphragm has been used for this purpose. The perforation made by such an instrument is not large enough to impair the smoothness of the surface or to permit leakage between the interior and exterior of the structure. In cases where the dimensions and physical characteristics of the structure are such that a damping medium of the same character as the ambient fluid may be used, a slightly pervious outer diaphragm that will permit slow leakage to take place between the interior and exterior of the structure may be provided. Such leakage, which must take place at a substantially slower flow rate than the internal fluid motion induced by the pressure gradients at the surface, will not only help to assure complete void-free filling of the structure, but will also render its operation less vulnerable to damage by collision with solid objects or matter entrained in the external flow.

Figures 10, 12:
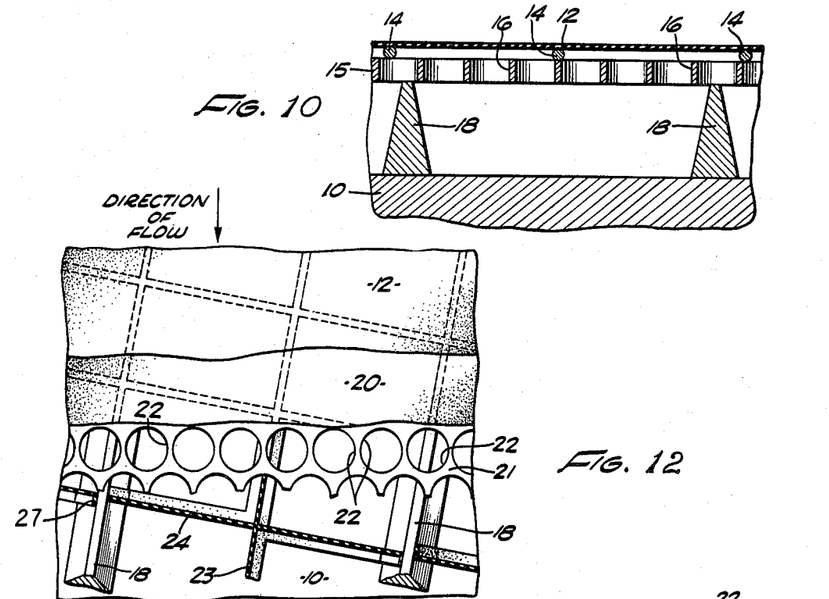
FIGURE 10 is a cross-sectional view of a multiple layer surface structure employed in a test procedure that avoided pressure gradients.
FIGURE 12 is a fragmentary plan view of the surface structure of FIGURE 11 with successive layers broken away.

FIGURE 10 shows an embodiment of the invention as used in a water-filled test equipment where no pressure gradient exists in any direction parallel to the surface. This embodiment is in the form of a fluid-filled four-layer surface structure mounted on a basic structure 10 which may be, for example, the hull of a boat or the wing of an airplane. The outer layer 12 is a thin flexible membrane of suitable rubber-like material. The next layer comprises means to support the outer layer 12 in a manner that permits the outer layer to flex freely in response to the oscillating pressure of the boundary layer stream. In this instance, this second layer comprises a series of ribs in the form of parallel wires 14 extending at an acute angle to the general direction of relative movement between the surface structure and the contiguous laminar boundary layer.

The third layer is a rigid structure having numerous relatively small passages therethrough, and may be in the form of a metal plate 15 having numerous closely spaced bores 16. Finally, the fourth layer consists essentially of spaced supports for the perforated plate 15, which supports may be in the form of ribs 18, these ribs forming a relatively thick support layer of open construction to provide relatively large fluid-filled spaces.

This particular embodiment of the invention is designed to function in liquid on a concave surface of a concave wall of a test apparatus at a critical Reynolds number of approximately $10^6$, and, of course, the fluid with which the multiple-layer surface structure is filled is also a liquid. In this particular example, the outer membrane 12 is a smooth rubber sheet that it approximately .016" in thickness and is stretched approximately 10% in a direction perpendicular to the direction of flow of the boundary layer. Since the boundary layer flows in the general direction of the wires 14, the membrane 12 is stretched across the wires. The stretched rubber membrane 12 provides a surface of the desired smoothness for contact with the laminar boundary layer, and, since it is spaced from the rigid plate 15 by the wires 14, it is free to respond by flexure to the static pressure oscillations of the boundary layer. The rubber membrane 12 confines the fluid in the spaces of the multiple-layer structure and may be fluid-tight for that purpose. If, however, the confined fluid is the same as the fluid of the boundary layer, the outer membrane 12 may be porous to a slight degree for retarded permeability, so that the fluid of the boundary layer may penetrate the interior of the multiple-layer surface structure by slow leakage for automatic replenishment of the confined fluid.

The wires 14 of the second layer may be approximately one-sixteenth inch in diameter and spaced approximately one inch apart. The plate 15 forming the rigid third layer may be a metal plate one-eighth inch thick, and the bores 16 may be approximately 0.217" in diameter and spaced apart 0.250" center to center. The ribs 18 of the fourth layer are of a depth to space the plate 15 approximately one-half inch from the basic structure 10.

It is apparent that the described multiple-layer surface structure provides numerous loops or paths of pressure communication between spaced points of the outer membrane 12. Thus, a path of pressure communication from one point or small region of the outer membrane 12 may extend through a bore 16 into the large fluid-filled spaces of the fourth layer and back through a second bore 16 to a second point or small region of the outer membrane. There will be numerous pressure differentials established across numerous paths of this character by reason of the pressure oscillations of the boundary layer against the outer membrane 12 and consequently momentary or oscillatory flow will occur along the paths, and especially along paths that connect a wave crest with an adjacent wave trough. The bores 16 provide resistance to such momentary or oscillatory flow along the various paths, and thus at least partially dissipate the flow energy. It is in this manner that the multiple-layer surface structure derives components of oscillatory force from the boundary layer and dissipates such components so as to damp and stabilize the boundary layer.

For any given installation of the described multiple-layer surface structure for given service conditions, there will be optimum dimensions for the various components of the surface structure. Thus, the thickness of the membrane, the diameter of the wires 14, the thickness of the plate 15, the diameter and spacing of the bores 16, and the depth of the ribs 18 will vary for maximum effectiveness under different conditions. In each instance, the bores 16 will be sufficiently restricted in diameter for high friction losses to absorb energy to the optimum degree.

In general, the dimensions of the different components of the multiple-layer surface structure for optimum results vary with the laminar boundary layer thickness, greater resistance along the internal surface-to-surface paths being required at the higher Reynolds numbers. There is reason to believe that the total thickness of the multiple-layer surface structure should be of the order of magnitude of one to three times the thickness of the laminar boundary layer that is to be controlled, the thickness of the boundary layer being $3.4L/\sqrt{R}$ where L equals length of the surface structure in the direction of relative movement, as hereinbefore set forth.

Figure 9:
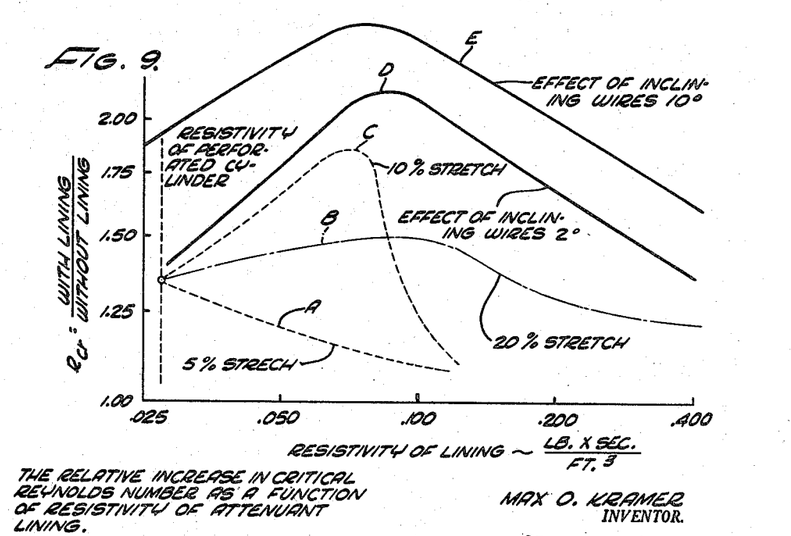
FIGURE 9 is a graph showing the results of certain tests.

In many instances, the final "tuning" of the multiple-layer surface structure for resonance with the frequency of the pressure oscillations of the laminar boundary layer may be accomplished merely by varying the stretch or tension of the outer membrane 12. FIGURE 9, for example, illustrates the results of certain tests in which the combined effects of varying the resistance to internal flow within the structure, stretching the outer membrane 12, and inclining the wires 14 to the direction of boundary layer flow, were plotted against critical Reynolds number. The internal resistance to flow was varied by placing different degrees of wire mesh against one face of the perforated plate 15, and the rubber comprising the membrane 12 was stretched to 105, 120 and 110 percent of its unrestrained dimension before bonding it to the wires 14. Curve A illustrates that with only 5 percent stretch the structure achieved a maximum effectiveness when the internal resistance to flow was at a minimum; specifically, this maximum represented a 35 percent increase in critical Reynolds number. Curve B illustrates that with the membrane stretched 20 percent a gain of almost 50 percent in critical Reynolds number was realized over a broad range of internal resistivity. Curve C illustrates the effect of 10 percent stretch, which gave an increase of approximately 90 percent in critical Reynolds number; and curves D and E, both of which exhibit broad peaks representing more than a 100 percent increase in critical Reynolds number, illustrate the combined effects of stretching the membrane 10 percent and inclining the wires 14 at angles of two degrees and ten degrees, respectively, to the direction of boundary layer flow.

Even when resonance is not accomplished, however, the multiple-layer surface structure can effectively increase the viscous damping of boundary layer oscillations and can be effective to keep the boundary layer laminar where it would otherwise become dynamically unstable and turn turbulent if the basic structure 10 were exposed. Thus, the invention may serve to extend the fully laminar portion of the curve of FIGURE 1 into the higher Reynolds numbers, as indicated by the dotted line 24. An important feature of the multiple-layer surface structure is that it is effective in the absence of a favorable pressure gradient in the direction of boundary layer flow and continues to be effective even where unfavorable pressure gradients prevail.

Figure 11:
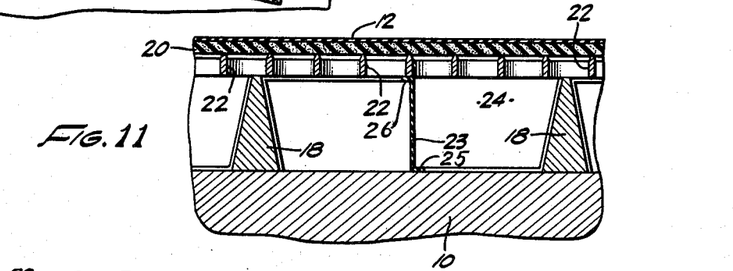
FIGURE 11 is a view similar to FIGURE 10 illustrating a modification of the multiple layer surface structure.

The embodiment of the invention shown in FIGURES 11 and 12 is similar to that shown in FIGURE 10, but is specifically adapted for use where a pressure gradient exists and, therefore, differs in incorporating additional means to prevent extensive unidirectional flow through the multiple-layer surface structure. This embodiment also differs in the substitution of a layer of permeable or open-cell foam rubber 20 for the wires 14 to support the outer membrane 12. The foam rubber layer 20 is, in turn, supported by the usual pltae 21 having perforations 22. Preferably, the perforations 22 are flared at their upper ends as indicated in FIGURE 11. The perforated plate 21 is supported on the hull or basic structure 10 by the usual spaced ribs 18.

To prevent extensive flow along the fourth layer or space beneath the perforated plate 21 while permitting free pressure communication, this space is subdivided by intersecting flexible walls comprising generally longitudinal pressure-responsive walls 23 and generally transverse pressure-responsive walls 24. These walls may comprise, for example, ribbons of rubber or other similar material suitably bonded to each other and also preferably bonded both to the basic structure or hull 10 and the perforated metal plate 21.

In the construction shown in the drawings, the walls 23 and 24 have marginal flanges or lips 25 bonded to the basic structure 10, similar marginal flanges or lips 26 bonded to the underside of the perforated plate 21, and similar flanges or lips 27 bonded to the spaced ribs 18. Preferably, the longitudinal pressure-responsive walls 23 are inclined at an acute angle to the direction of flow as shown in FIGURE 12. It is further contemplated that the foam rubber layer 20 will be bonded to the outer surface of the perforated plate 21 and to the inner surface of the outer membrane 12 in the same regions as the pressure-responsive walls 23 and 24. With these bonded regions coinciding with the flexible walls 23 and 24, the fluid confined in the multiple-layer surface structure is divided into portions that are in pressure communications with each other, but not flow communication.

Figure 17:
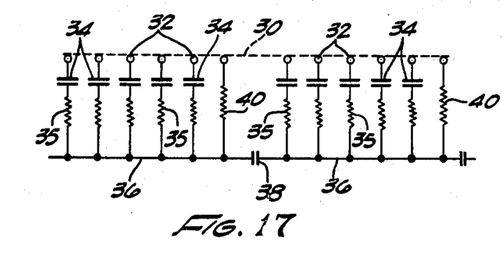
FIGURE 17 is a diagram of an electrical arrangement that is analogous to the mechanical arrangements shown in FIGURES 2 to 8 inclusive and 10 to 15 inclusive.

The purpose of FIGURE 17 is to illustrate diagrammatically the fact that the structure and functioning of the multiple-layer surface structure of the invention are analogous to the structure and functioning of an equivalent electrical net-work. In FIGURE 17, the dotted line 30, which corresponds to the boundary layer, represents a flow of electrical current, the electrical current being direct current with an alternating component. The terminal contacts 32 represent numerous surface points along the outer membrane 12 that are to be placed in communication with each other to form internal surface-to-surface paths along which potential differences may be established.

The small capacitors 34, which correspond to the outer membrane or diaphragm provided in the various embodiments of the invention, block flow of direct current but nevertheless pass the alternating components. The resistors 35, in series with the various small capacitors 34, represent the opposition to flow of the viscous damping fluid along the various internal surface-to-surface paths. The lower conductors 36, which are separated by capacitors 38, represent the relatively large bodies of fluid in the fourth layer of the surface structure of FIGURES 11 and 12, the capacitors 38 representing the flexible pressure-responsive walls 23 and 24. Finally, the resistors 40 that shunt the capacitors 34, as well as the resistors 35, are trickle resistors of high ohmic value and represent the retarded permeability of the outer membrane when the outer membrane is made slightly porous to permit slow leakage of fluid therethrough without interfering with its normal pressure-responsiveness.

Figure 6:
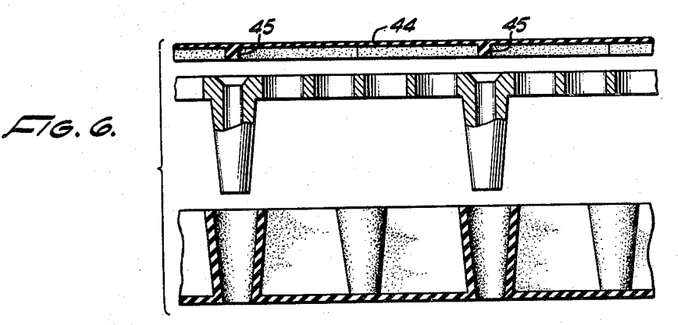
FIGURE 6 is a sectional view of the components of a third embodiment of the invention, the components being separated ready for assembly.
Figure 7:
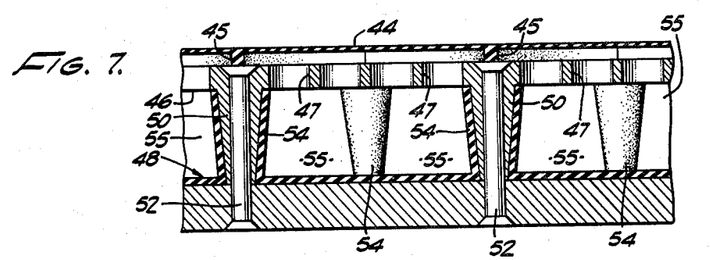
FIGURE 7 is a similar sectional view showing the components of FIGURE 6 assembled together to form the multiple layer surface structure.
Figure 8:
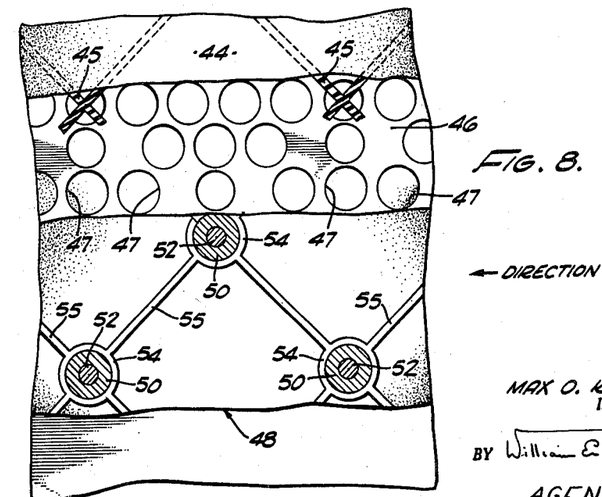
FIGURE 8 is a fragmentary view of the surface structure of FIGURE 7 with successive layers broken away.

The additional embodiment of the invention shown in FIGURES 6, 7 and 8, comprises an outer sheet 44 of rubber-like material having ribs 45 on its inner surface, an intermediate rigid plate 46 having numerous perforations 47, and an inner molded member 48 of rubber-like material. Preferably, these three members are cemented or otherwise bonded together to form a unitary surface structure.

The ribs 45 of the outer sheet 44 serve the same purpose as the wires 14 of the embodiment shown in FIGURE 10. In the construction shown, the ribs 45 are at an acute angle to the direction of boundary layer flow and intersect to form diamond-shaped pressure-responsive zones. It can be seen that these ribs extend at equal angles from the direction of boundary layer flow. As shown in the drawings, the perforated plate 46 is free from perforations adjacent the ribs 45. The underside of the perforated plate 46 has integral supporting spacers in the form of tapered lugs or bosses 50 which preferably coincide with the intersections of the diagonal ribs 45. For the purpose of mounting the mutliple-layer surface structure on the basic structure or hull 10, counter-sunk holes may be provided in the bosses 50 to receive mounting rivets 52.

The inner molded member 48 comprises a sheet of the rubberlike material that lies against the basic structure 10 and is apertured to permit the bosses 50 to abut the surface structure. Integral with the sheet 48 are sleeves 54 to embrace the individual bosses 50 and these sleeves are interconnected by transverse webs 55 that are diagonally disposed to register with the diagonal webs 45. Thus, this surface structure provides a series of diamond-shaped zones that contain fluid and are isolated from each other by the ribs 45.

Figure 20:
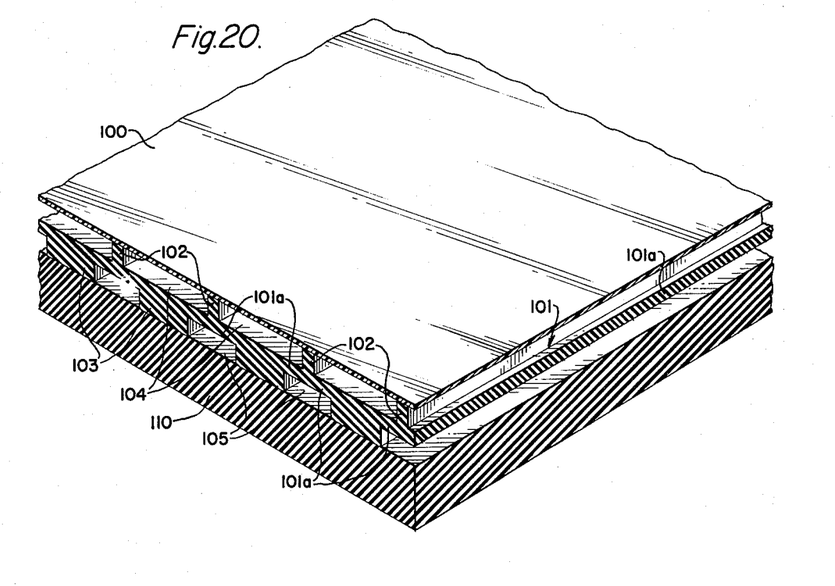
FIGURE 20 is a perspective view, partially broken away, of an embodiment of the invention adapted to use in a gaseous environment.

FIGURE 20 is a perspective view, partially broken away and on a greatly enlarged scale, of an anisotropic embodiment of the invention that has been successfully tested in air at speeds up to 500 miles per hour. As shown in the drawing, an outer membrane 100 is supported in spaced relation to the rigid surface of an aircraft by a base plate 110 and an intermediate membrane or diaphragm 101, the latter being provided with upper ribs 102 for attachment to the outer membrane 100 and lower ribs 103 for attachment to the base plate 110, the ribs 102 and 103 extending longitudinally of the structure and substantially parallel to the prevailing direction of relative air flow. The upper ribs 102 are spaced at equal intervals from each other, as are the lower ribs 103, the upper ribs being laterally displaced from the lower ribs by an amount equal to approximately one half the spacing interval, thereby to accommodate flexural displacement of intermediate webs 101a in response to local pressure variations impressed on the outer membrane 100 by oscillations in the fluid boundary layer.

In a preferred practice of the invention, the outer membrane 100 may be of flexible material possessing relatively high tensile strength, for example polyethylene terephthalate film, having a thickness of approximately one thousandth of an inch, the membrane being adhesively bonded to the ribs 102. The intermediate membrane 101 may be of a suitable resilient material, for example, rubber or a synthetic elastomer, the thickness of the webs 101a being approximately four thousandths of an inch. The upper and lower ribs 102 and 103 are preferably of the same material as the intermediate membrane 101 and may, of course be formed integrally therewith, each rib extending approximately nine thousandths of an inch from the central plane thereof so as to support the outer membrane 100 at a distance of approximately eighteen thousandths of an inch from the base plate 110 to which the ribs 103 may be adhesively bonded. The width of each of the upper ribs may be approximately four thousandths of an inch, and the spacing between their respective centerlines approximately twenty thousandths of an inch, the channels 104 between adjacent ribs being approximately sixteen thousandths of an inch. The width of each of the lower ribs 103 may be approximately ten thousands of an inch, the spacing between the centerlines of adjacent ribs being the same as for the ribs 102, thereby to provide lower channels 105 equal in width to the ribs 103. In the preferred practice of the invention, the viscous damping of the oscillatory energy imparted to the membrane 100 by the fluid boundary layer occurs principally in the rubber or elastomeric material comprising the membrane 101 and the attached ribs 102 and 103, the channels 104 and 105 being preferably filled with a fluid of the same character as the boundary layer, for example air, and vented thereto so as to accommodate pressure variations resulting from changes in altitude.

The base plate 110 serves primarily to provide adequate strength and support for the composite surface structure and may preferably be formed of rubber or like material having sufficient flexibility to conform to the exterior surface contours of an aircraft structure and to be fixedly attached thereto, for example by adhesive bonding.

The stiffness of a composite surface structure according to the embodiment of the invention shown in FIGURE 20 may be measured by supporting the same on a smooth, rigid surface and gauging the deflection of the outer membrane 100 when a compressive load is applied thereto, a desirable value for said stiffness being approximately 1000 pounds per cubic inch. That is, when a pressure of one pound per square inch is applied to the membrane 100, the deflection thereof should be approximately one thousandth of an inch.

It is to be understood, of course, that the design of a composite surface structure for distributed boundary layer damping as illustrated in FIGURE 20 may be carried out according to the analytical methods hereinbefore set forth, the foregoing dimensions, which pertain specifically to an experimentally tested structure according to this embodiment of the invention, being presented for exemplary purposes only and not by way of limitation.

In the several embodiments of the invention described herein, attention has been directed toward the primary function of dampening or attenuating oscillatory disturbances in the boundary layer due to dynamic instability or to ambient or virgin turbulence. It should be emphasized, however, that in addition to achieving this end, further important benefits may be realized through the correct application of composite surface structures as described herein. For example, where the surface structure is designed to maintain laminar boundary layer flow and preserve a low coefficient of friction in water, the range of critical frequencies to be considered substantially coincides with the audible spectrum of acoustic phenomena; in this case, therefore, the structure operates not only to suppress the generation of turbulence noise, as previously mentioned, but also to damp or inhibit the reflection of sounds projected from other sources. Where the outer membrane or diaphragm is of suitable thickness and mechanical properties, as discussed in relation to the embodiment of the invention shown in FIGURES 13, 14 and 15, this effect can be extended substantially beyond the audible to the ultra-sonic range of phenomena so as to afford a significant measure of protection against the detection of submarine vessels or of the submerged portions of surface vessels by acoustic techniques. In some instances, this feature of the invention may equal the importance of its primary function.

The foregoing disclosure will provide adequate guidance for those skilled in the art who may have occasion to apply the principles of the invention to the problems of stabilizing laminar boundary layer flow or of controlling oscillatory phenomena for various purposes in both hydrodynamics and aero-dynamics. It is to be understood that the multiple-layer surface structures disclosed here in specific detail are merely examples to illustrate the principles involved. It is obvious that these structures, in their several types and configurations, may be varied widely in dimensions, materials, and structural relationships within the intended spirit and scope of the invention.

I claim:

1. Means for reducing the resistance to relative movement between a solid body and a contiguous fluid created by boundary layer flow under conditions where a turbulent boundary layer of a given pulsation frequency range tends to occur, comprising
   a composite structure including:
   an outer membrane for exposure to said contiguous fluid; and
   means for supporting said membrane in spaced relation to the surface of said body,
   said supporting means including a base portion for attachment to the surface of said body and an intermediate portion comprising a resilient diaphragm having upper ribs for attachment to said outer membrane and lower ribs for attachment to said base portion,
   said upper ribs being laterally displaced from said lower ribs so as to accommodate flexural displacement of said diaphragm in response to motion of said outer membrane,
   said composite structure having a modulus of elasticity for yielding response to pressure pulsations of the given frequency range whereby the mechanical reaction of the covering to the range pulsations of the boundary layer substantially reduces the resistance to relative movement.

2. Means for reducing the resistance to relative movement between a solid body and a contiguous fluid created by boundary layer flow under conditions where a turbulent boundary layer of a given pulsation frequency range tends to occur, comprising
   a composite structure including:

an outer membrane for exposure to said contiguous fluid;

a base portion for attachment to the surface of said body; and resilient means for supporting said membrane in spaced relation to said base portion, said resilient means comprising an intermediate diaphragm, a uniformly spaced series of lower ribs extending from said base portion to one surface of said diaphragm, and a uniformly spaced series of upper ribs extending from the other surface of said diaphragm to said membrane, said upper and lower ribs being approximately aligned with the direction of said relative flow but laterally displaced from each other so as to permit flexure of said diaphragm in response to motion of said outer membrane, said composite structure having a modulus of elasticity for yielding response to pressure pulsations of the given frequency range whereby the mechanical reaction of the covering to the range of pulsations of the boundary layer substantially reduces the resistance to relative movement.

3. Means for reducing the resistance to relative movement between a solid body and a contiguous fluid created by boundary layer flow under conditions where a turbulent boundary layer of a given pulsation frequency range tends to occur, comprising a composite structure including:

an outer membrane for exposure to said contiguous fluid;

resilient means for supporting said membrane in spaced relation to the surface of said body, said resilient means comprising a plurality of spaced resilient stubs; and fluid means confined in the spaces between said stubs and in pressure-communicating relation with said membrane, said composite structure having a modulus of elasticity for yielding response to pressure pulsations of the given frequency range whereby the mechanical reaction of the covering to the range of pulsations of the boundary layer substantially reduces the resistance to relative movement.

4. Means for reducing the resistance to relative movement between a solid body and a contiguous fluid created by boundary layer flow under conditions where a turbulent boundary layer of a given pulsation frequency range tends to occur, comprising:

a surface structure on the surface of said body having an outer flexible pressure-responsive layer for contact with said boundary layer, the interior of said surface structure being characterized by numerous fluid-filled cavities, said cavities being cut off from free flow communication with the exterior of said body but being in pressure-responsive communication with each other to provide numerous internal paths between points on said flexible outer layer for pressure communication between the points and consequent oscillatory fluid flow along the paths in repsonse to pressure differentials between the points, said fluid-filled structure having a modulus of elasticity for yielding response to pressure pulsations of the given frequency range whereby the mechanical reaction of the covering to the range of pulsations of the boundary layer substantially reduces the resistance to relative movement.

5. A surface structure as set forth in claim 4, which has fluid-filled cavities of relatively small cross-sectional area in an outer zone near said outer flexible layer and has fluid-filled cavities of relatively large cross-sectional area in an inner zone, each of said relatively large cavities being in fluid-pressure communication with a plurality of the smaller cavities.

6. A surface structure as set forth in claim 4, in which said pressure-responsive outer layer is a membrane stretched under tension.

7. A surface structure as set forth in claim 4 which has relatively small fluid-filled cavities in an outer zone and has relatively large fluid-filled cavities in an inner zone, each of said relatively large cavities being in pressure communication with a plurality of the smaller fluid-filled cavities, said relatively large fluid-filled cavities being separated from each other by flexible walls for pressure communications with each other.

8. Means for maintaining a laminar boundary layer as set forth in claim 4, which includes a spongy layer of resilient material between said membrane and said passage means.

9. Means for reducing the resistance to relative movement between a solid body and a contiguous fluid created by boundary layer flow under conditions where a turbulent boundary layer of a given pulsation frequency range tends to occur, comprising a structure including:

a flexible membrane having its surface at said boundary layer and mounted on said body with freedom for flexural response to pressure oscillations in the boundary layer;

means cooperative with said membrane to confine a layer of fluid of the same general character as the fluid of boundary layer in a zone inwardly of said membrane in pressure communication with the membrane; and passage means in said zone providing numerous paths of pressure communication between numerous points on said membrane, whereby pressure oscillations in the boundary layer at said points cause oscillating flow of the confined fluid along said paths, said structure having a modulus of elasticity for yielding response to pressure pulsations of the given frequency range whereby the mechanical reaction of the covering to the pulsations substantially reduces the resistance to relative movement.

10. Means for reducing the resistance to relative movement between a solid body and a contiguous fluid created by boundary layer flow under conditions where a turbulent boundary layer of a given pulsation frequency range tends to occur, comprising a composite structure including:

a flexible membrane having its surface at said boundary layer and mounted on said body with freedom for flexural response to pressure oscillations in the boundary layer;

means cooperative with said membrane to confine fluid of the same general character as the fluid of the boundary layer in a zone inwardly of said membrane in pressure communication with the membrane; and passage means in said zone providing numerous paths of pressure communication between numerous points on said membrane, whereby pressure oscillations in the boundary layer at said points cause oscillating flow of the confined fluid along said paths, said passage means including a rigid structure with numerous passages therethrough, said rigid structure being mounted on said body and being spaced inwardly from said membrane to provide clearance for free flexure of the membrane, said composite structure having a modulus of elasticity for yielding response to pressure pulsations of the given frequency range whereby the mechanical reaction of the covering to the range pulsations of the boundary layer substantially reduces the resistance to relative movement.

11. A combination as set forth in claim 10, in which said membrane is mounted on said rigid structure by spaced supports.

12. A combination as set forth in claim 11, in which said spaced supports are elongated elements extending at an acute angle to the general direction of flow of the boundary layer.

13. A combination as set forth in claim 10, in which said rigid structure comprises a perforated plate.

14. A combination as set forth in claim 13, which includes a layer of spongy resilient material between said perforated plate and said outer membrane.

15. A combination as set forth in claim 13, which includes flexible walls in said zone on the inner side of said perforated plate dividing the confined fluid into numerous portions to prevent direct flow from portion to portion while permitting oscillatory pressure communication from portion to portion.

16. Means for reducing the resistance to relative movement between a solid body and a contiguous fluid created by boundary layer flow under conditions where a turbulent boundary layer of a given pulsation frequency range tends to occur, comprising a resilient covering on said surface having a smooth outer surface portion; and substantially parallel elastomeric partitions incorporated in said covering and extending in the general direction of the flow of the laminar boundary layer, said partitions resiliently supporting said outer surface portion in spaced relation to the surface of the solid body and resisting by resilient transverse compression movement of said outer portion towards the surface of the solid body, said covering having a modulus of elasticity for yielding response to pressure pulsations of the given frequency range whereby the mechanical reaction of the covering to the pulsations substantially reduces the resistance to relative movement.

17. Means for maintaining a laminar boundary layer as set forth in claim 16 in which portions of said partitions joining said outer surface portion are laterally inclined to acute angles relative to said outer surface portion.

18. A combination as set forth in claim 17 in which said partitions are of bent transverse cross sectional configuration.

References Cited in the file of this patent

UNITED STATES PATENTS

| | | |
|---|---|---|
| 1,195,857 | Royston | Aug. 22, 1916 |
| 2,389,210 | Pitman | Nov. 20, 1945 |
| 2,742,247 | Lochmann | Apr. 17, 1956 |
| 2,783,008 | Bodine | Feb. 26, 1957 |
| 2,884,084 | Sussman | Apr. 28, 1959 |

FOREIGN PATENTS

| | | |
|---|---|---|
| 162,280 | Australia | Mar. 30, 1955 |